(12) United States Patent
Mo

(10) Patent No.: US 12,357,104 B2
(45) Date of Patent: Jul. 15, 2025

(54) FABRIC STRUCTURE AND CHILD SUPPORTER

(71) Applicant: BAMBINO PREZIOSO SWITZERLAND AG, Steinhausen (CH)

(72) Inventor: Xiaolong Mo, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 125 days.

(21) Appl. No.: 18/031,328

(22) PCT Filed: Oct. 12, 2021

(86) PCT No.: PCT/EP2021/078121
§ 371 (c)(1),
(2) Date: Apr. 11, 2023

(87) PCT Pub. No.: WO2022/078991
PCT Pub. Date: Apr. 21, 2022

(65) Prior Publication Data
US 2023/0371711 A1 Nov. 23, 2023

(30) Foreign Application Priority Data
Oct. 12, 2020 (CN) .......................... 202022265805.2

(51) Int. Cl.
*B60N 2/28* (2006.01)
*A47C 7/38* (2006.01)
(Continued)

(52) U.S. Cl.
CPC ................ *A47D 1/002* (2013.01); *A47C 7/38* (2013.01); *A47C 7/40* (2013.01); *A47C 31/11* (2013.01); *B60N 2/2881* (2013.01); *B60N 2/60* (2013.01)

(58) Field of Classification Search
CPC ............................... B60N 2/2881; B60N 2/60
(Continued)

(56) References Cited

U.S. PATENT DOCUMENTS 5,234,252 A 8/1993 Wallach
7,537,284 B1 * 5/2009 Antorcha ............. B60N 2/2881
297/219.12
(Continued)

FOREIGN PATENT DOCUMENTS

CN 205523830 U 8/2016
CN 108248471 A 7/2018

OTHER PUBLICATIONS

TW110137838 Office Action Dated Jul. 18, 2022 English Abstract Provided.
(Continued)

*Primary Examiner* — Rodney B White
(74) *Attorney, Agent, or Firm* — Volpe Koenig

(57) ABSTRACT

The present disclosure discloses a fabric structure and a child supporter. The fabric structure includes a backrest fabric for covering a backrest, a headrest fabric for covering a headrest and a shielding member for shielding the adjusting region. The backrest has an adjusting region. The headrest is capable of being adjusted along the adjusting region relative to the backrest. The shielding member is a telescopic structure. An upper end of the shielding member is connected to the backrest fabric adjacent to an upper end of the adjusting region. A lower end of the shielding member is connected to the backrest fabric adjacent to a lower end of the adjusting region. When the position of the headrest is adjusted relative to the backrest, the telescopic structure is telescopic to shield the adjusting region.

15 Claims, 3 Drawing Sheets

(51) Int. Cl.
  *A47C 7/40*    (2006.01)
  *A47C 31/11*   (2006.01)
  *A47D 1/00*    (2006.01)
  *B60N 2/60*    (2006.01)

(58) Field of Classification Search
  USPC .................................................. 297/219.12
  See application file for complete search history.

(56) References Cited

U.S. PATENT DOCUMENTS

| | | | | |
|---|---|---|---|---|
| 8,888,180 | B2 * | 11/2014 | Popovic | A47C 31/113 297/219.12 |
| 9,022,470 | B2 * | 5/2015 | Fujita | B60N 2/2812 297/219.12 |
| 9,067,516 | B2 | 6/2015 | Hutchinson et al. | |
| 9,365,136 | B2 | 6/2016 | Strmiska et al. | |
| 2020/0231072 | A1 | 7/2020 | Sandford et al. | |

OTHER PUBLICATIONS

PCT/EP/2021/078121 International Search Report Dated Feb. 8, 2022.
PCT/EP/2021/078121 Written Opinion Dated Feb. 8, 2022.

* cited by examiner

FABRIC STRUCTURE AND CHILD SUPPORTER

CROSS-REFERENCE OF RELATED APPLICATION

The present disclosure is a National Stage 371 of International Patent Application No. PCT/EP2021/078121, filed on Oct. 12, 2021, which claims the priority of a Chinese patent application filed with the Chinese Patent Office on Oct. 12, 2020, with the application number 2020222658052, and the name "FABRIC STRUCTURE AND CHILD SUPPORTER", the entire content of which are incorporated herein by reference.

TECHNICAL FIELD

The present disclosure relates to the field of baby products, and in particular, to a fabric structure and a child supporter.

BACKGROUND

Heights of children at different ages vary greatly in different countries due to different races, ages and degrees of individual development. In order to meet practical needs of children of different sizes, a headrest of a child supporter is generally designed to be movable to adjust its height position so as to support heads of different children. However, in an existing child supporter with a headrest height adjusting mechanism, such as a child safety seat, a gap between the headrest and a backrest is small, and the headrest may interfere with a backrest fabric during adjustment, thereby affecting normal use of the headrest adjusting mechanism. In order to prevent obstacles of the backrest fabric to the adjustment of the headrest, the fabric in an adjusting region of the backrest and the headrest may generally be omitted. However, this may cause the headrest adjusting mechanism to be exposed to a surface of the child safety seat, which easily entraps infants and affects the appearance.

SUMMARY

According to various embodiments of the present disclosure, a fabric structure is provided, which includes a backrest fabric configured to cover a backrest and a headrest fabric configured to cover a headrest. The backrest has an adjusting region. The headrest is capable of being adjusted along the adjusting region relative to the backrest. The fabric structure further includes a shielding member configured to shield the adjusting region. The shielding member has a telescopic structure. An upper end of the shielding member is connected to the backrest fabric adjacent to an upper end of the adjusting region, and a lower end of the shielding member is connected to the backrest fabric adjacent to a lower end of the adjusting region. When the headrest is adjusted relative to the backrest, the shielding member is telescopic to shield the adjusting region.

The present disclosure further provides a child supporter, which includes a supporter body, a backrest, a headrest, a headrest adjusting mechanism and the fabric structure according to any one of the aforementioned embodiments. The backrest has an adjusting region. A headrest provided on the supporter body. The headrest adjusting mechanism is provided in the adjusting region. The headrest is slidably adjustable relative to the backrest along a vertical direction by the headrest adjusting mechanism. In one embodiment, the child supporter of the present disclosure has a safety seat structure, a stroller structure, a cradle structure or an infant dining chair structure.

Details of one or more embodiments of the present disclosure are set forth in the following accompanying drawings and descriptions. Other features, objectives, and advantages of the present disclosure become obvious with reference to the specification, the accompanying drawings, and the claims.

BRIEF DESCRIPTION OF THE DRAWINGS

In order to better describe and illustrate embodiments and/or examples of those disclosures disclosed herein, reference may be made to one or more accompanying drawings. Additional details or examples used to describe the accompanying drawings should not be considered as limitations on the scope of any of the disclosed disclosures, the embodiments and/or examples presently described, and the best mode of these disclosures presently understood.

DETAILED DESCRIPTION OF THE EMBODIMENTS

In order to describe technical contents and structural features of the present disclosure in detail, the following is a further description with reference to implementations and the accompanying drawings. The present disclosure is further described below with an example in which a child supporter is a safety seat.

Figure 1:
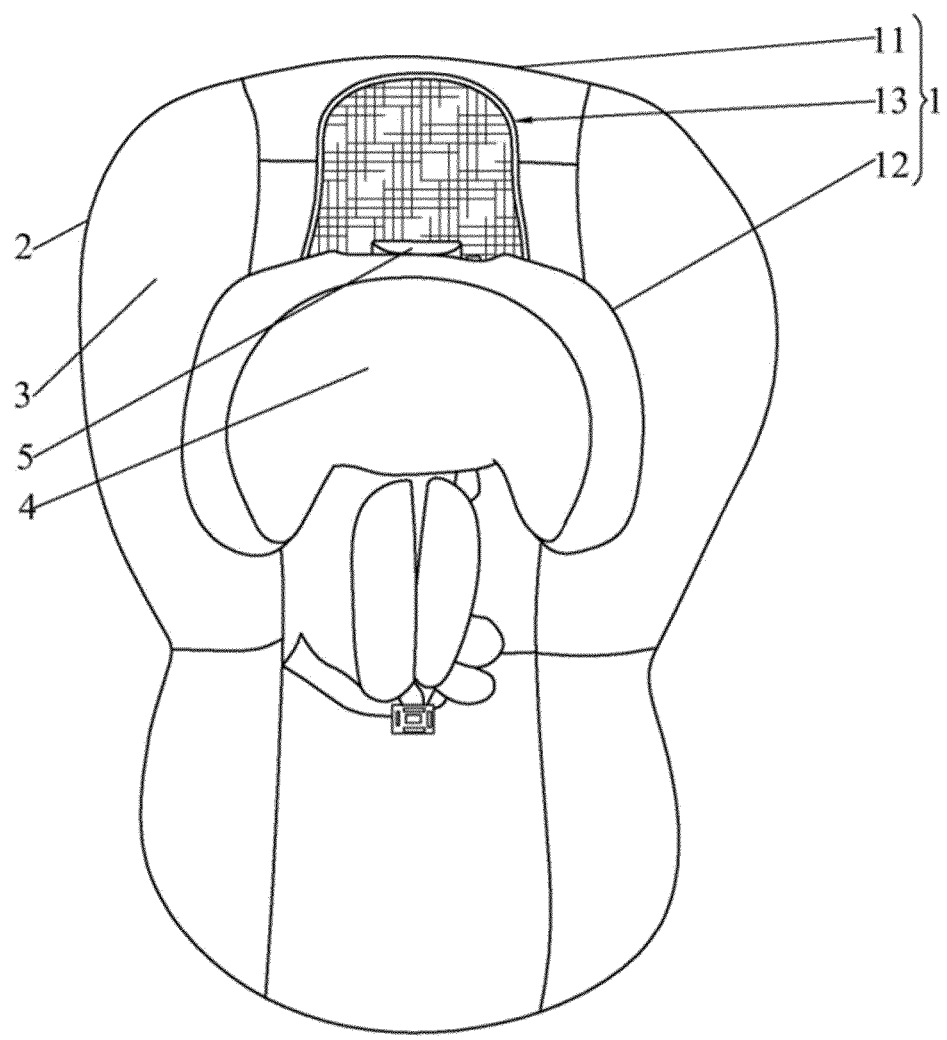
FIG. 1 is a schematic view of a child supporter according to an embodiment of the present disclosure.

As shown in FIG. 1, a child safety seat 100 according to an embodiment includes a fabric structure 1, a supporter body 2, a backrest 3, a headrest 4 and a headrest adjusting mechanism 5. The fabric structure 1 covers the exterior of the child safety seat 100, the backrest 3 and the headrest 4 are arranged on the supporter body 2, and the headrest adjusting mechanism 5 is arranged on the backrest 3. The backrest 3 has an adjusting region. The headrest is capable of being adjusted along the adjusting region relative to the backrest 3. Specifically, the headrest 4 is slidably arranged on the backrest 3 along a vertical direction by means of the headrest adjusting mechanism 5. The fabric structure 1 includes a backrest fabric 11 configured to cover the backrest 3, a headrest fabric 12 configured to cover the headrest 4, and a shielding member 13 configured to shield the adjusting region. The headrest adjusting mechanism 5 is arranged in the adjusting region. That is, the shielding member 13 of the fabric structure 1 is arranged to directly opposite to the headrest adjusting mechanism 5 to shield the headrest adjusting mechanism 5. The headrest 4 forms an adjusting region in a position adjusting region on the backrest 3. The shielding member 13 has a telescopic structure. An upper end of the shielding member 13 is connected to the backrest fabric 11 adjacent to an upper end of the adjusting region. A lower end of the shielding member 13 is connected to the backrest fabric 11 adjacent to a lower end of the adjusting region.

Figure 2:
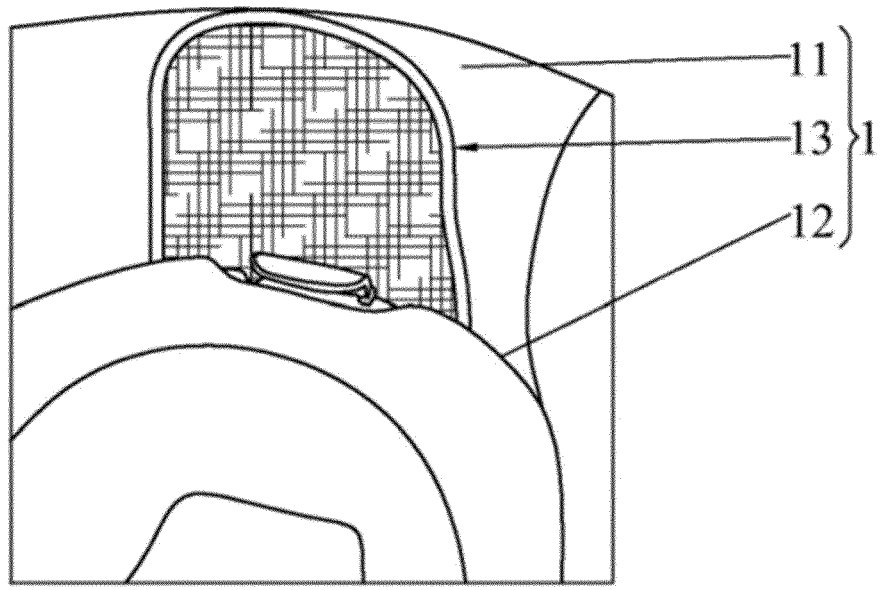
FIG. 2 is an use state schematic view of the child supporter shown in FIG. 1 when a shielding member thereof is unfolded.
Figure 4:
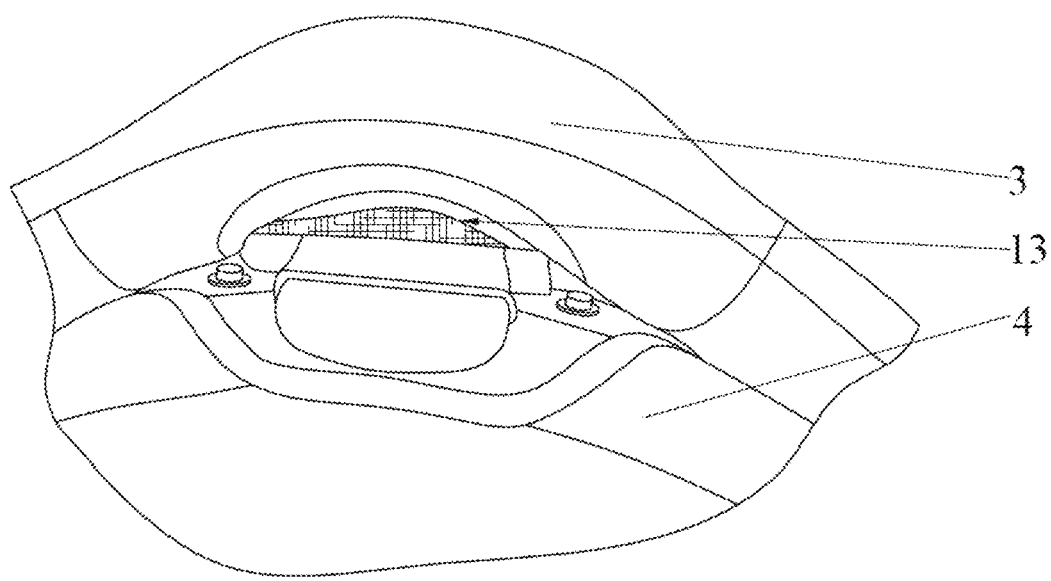
FIG. 4 is a schematic diagram of a top-down structure when the shielding member in the child supporter shown in FIG. 1 is folded.

As shown in FIG. 2, the headrest 4 is adjusted to a lowest position relative to the backrest 3, and the shielding member 13 is unfolded to shield the adjusting region. As shown in FIG. 4, the headrest 4 is adjusted to a highest position relative to the backrest 3, and the shielding member 13 is folded to shield the adjusting region. The adjustment of the position of the headrest 4 synchronously drives the shielding member 13 to be telescopically adjusted to shield the adjusting region.

Specifically, when the headrest 4 is adjusted to the highest position of the backrest 3, the shielding member 13 is stored in a folded form in the adjusting region and is shielded by the headrest 4, which doesn't affect the position adjustment of the headrest 4, prevent entrapment of infants, and keep an external structure of the child safety seat 100 simple and beautiful.

Figure 3:
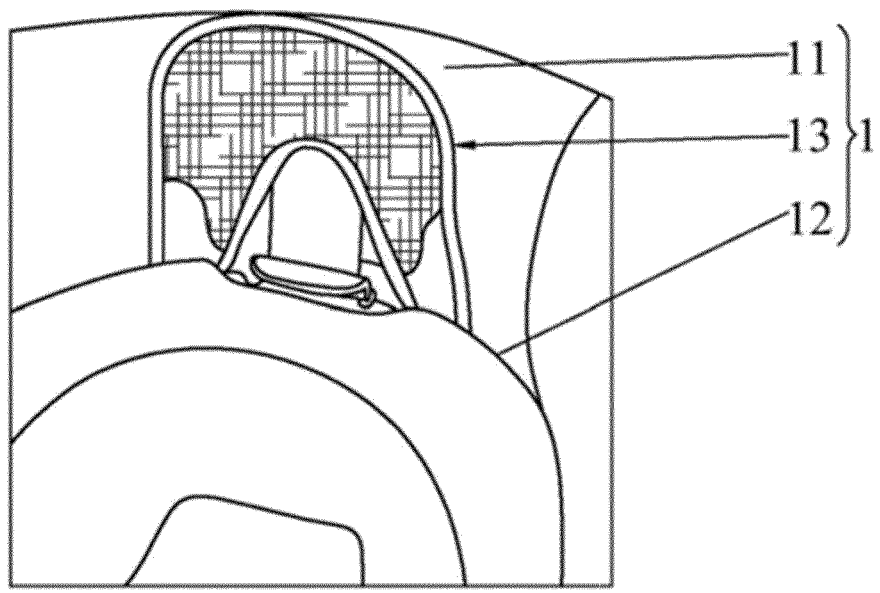
FIG. 3 is an use state schematic view of the child supporter shown in FIG. 1 when the shielding member thereof is folded.

As shown in FIGS. 1 to 3, the upper end of the shielding member 13 is fixedly connected to the backrest fabric 11 adjacent to the upper end of the adjusting region by sewing or adhesion. Certainly, the connecting manner between the shielding member 13 and the backrest fabric 11 is not limited thereto. The upper end of the shielding member 13 may also be detachably connected to the backrest fabric 11 at the upper end of the adjusting region. Specifically, the upper end of the shielding member 13 is detachably connected to the backrest fabric 11 adjacent to the upper end of the adjusting region by one of a zipper, a buckle, a bonding member, a fixed buckle and a fixed hole that are mutually matched, a HOOK&LOOP and a snap. Specifically, a thickness of the shielding member 13 is less than a thickness of the backrest fabric 11, and at the same time, the thickness of the shielding member 13 is less than a thickness of the headrest fabric 12. Specifically, the shielding member 13 has an elastic fabric structure, but is not limited thereto. The shielding member 13 may also has a fold structure, a mesh layer structure or a diffraction slit cloth structure.

Figure 5:
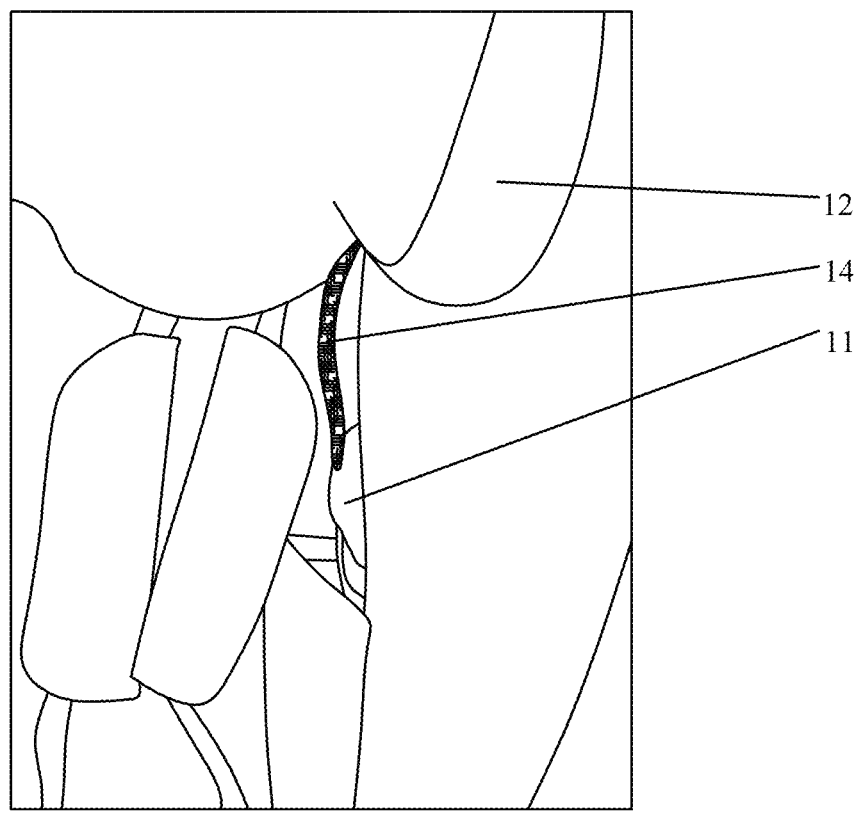
FIG. 5 is a schematic diagram of a connection state of an elastic member and a backrest fabric in the child supporter shown in FIG. 1.

As shown in FIG. 5, the lower end of the shielding member 13 is elastically connected to the backrest fabric 11 adjacent to the lower end of the adjusting region, so as to achieve telescoping of the shielding member 13 by means of telescoping of the elastic connection. Specifically, the fabric structure 1 further includes an elastic member 14. The lower end of the shielding member 13 is elastically connected to the backrest fabric 11 adjacent to the lower end of the adjusting region via the elastic member 14, and the telescoping of the shielding member 13 is achieved by telescoping of the elastic member 14. Specifically, one end of the elastic member 14 is connected to the lower end of the shielding member 13, and the other end of the elastic member 14 is connected to the backrest fabric 11 adjacent to the lower end of the adjusting region. Specifically, the elastic member 14 is an elastic band, but is not limited thereto. The elastic band may also be replaced by a spring sheet or a rubber band.

Specifically, the elastic member 14 may be further provided with a length adjusting mechanism. The length adjusting mechanism is a B-shaped buckle or a butterfly buckle. Specifically, the elastic member 14 may include a first elastic segment connected to the lower end of the shielding member 13 and a second elastic segment connected to the backrest fabric 11 adjacent to the lower end of the adjusting region, The length adjusting mechanism is fixed to the first elastic segment or the second elastic segment, and the second elastic segment or the first elastic segment is connected to the first elastic segment or the second elastic segment via the length adjusting mechanism.

In this way, the lower end of the shielding member 13 is provided with the elastic member 14. When the headrest 4 is adjusted upwards, the elastic member 14 is elongated, and the shielding member 13 is pulled upwards to form a folded shape to shield the smaller adjusting region between the backrest fabric 11 and the headrest fabric 12. when the headrest 4 is adjusted downwards, the elastic member 14 recovers and shortens under elasticity, and the shielding member 13 is pulled downwards and unfolded to shield the enlarged adjusting region between the backrest fabric 11 and the headrest fabric 12. Such that a size of the shielding member 13 is consistent with a size of the adjusting region in real time, so as to keep an overall structure of the appearance of the child safety seat 100 simple.

As shown in FIGS. 1 to 5, in the fabric structure 1 of the present disclosure, the position of the headrest 4 of the child safety seat 100 is required to be adjusted according to an actual situation based on different heights and weights of infants, so as to make the size of the adjusting region variable. When the headrest 4 is adjusted to the lowest position relative to the backrest 3, the adjusting region has a maximum area, and the shielding member 13 is unfolded to shield the adjusting region. When the headrest 4 is adjusted to the highest position relative to the backrest 3, the adjusting region has a minimum area, and the shielding member 13 is folded to shield the adjusting region. The adjusting region is provided with the shielding member 13 independent of the backrest fabric 11 and the headrest fabric 12, such that the backrest fabric 11 and the headrest fabric 12 will not interfere with each other when the headrest 4 is adjusted, so as to maintain smooth adjustment of the headrest 4. Moreover, the adjustment of the position of the headrest 4 synchronously drives the shielding member 13 to be telescopically adjusted to shield the adjusting region in real time, such that the size of the shielding member 13 is consistent with the size of the adjusting region in real time, so as to keep the overall structure of the appearance of the child safety seat 100 simple.

The foregoing disclosure are merely preferred embodiments of the present disclosure, and are not intended to limit the scope of the present disclosure. Therefore, equivalent variations made according to the claims of the present disclosure shall fall within the scope of the present disclosure.

The invention claimed is:

1. A fabric structure, comprising:
    a backrest fabric configured to cover a backrest;
    a headrest fabric configured to cover a headrest, the backrest having an adjusting region, the headrest is capable of being adjusted along the adjusting region relative to the backrest; and
    a shielding member configured to shield the adjusting region, an upper end of the shielding member is connected to the backrest fabric adjacent to an upper end of the adjusting region, a lower end of the shielding member is elastically connected to the backrest fabric adjacent to a lower end of the adjusting region, so as to achieve telescoping of the shielding member, and when the headrest is adjusted relative to the backrest, the shielding member is telescopic to shield the adjusting region.

2. The fabric structure according to claim 1, wherein when the headrest is adjusted to a lowest position relative to the backrest, the shielding member is unfolded to shield the adjusting region; when the headrest is adjusted to a highest position relative to the backrest, the shielding member is folded to shield the adjusting region.

3. The fabric structure according to claim 1, further comprising an elastic member, wherein the lower end of the shielding member is elastically connected to the backrest fabric adjacent to the lower end of the adjusting region via the elastic member, and the telescoping of the shielding member is achieved by telescoping of the elastic member.

4. The fabric structure according to claim 3, wherein one end of the elastic member is connected to the lower end of the shielding member, and the other end of the elastic member is elastically connected to the backrest fabric adjacent to the lower end of the adjusting region.

5. The fabric structure according to claim 3, wherein the elastic member is an elastic band, a spring sheet or a rubber band.

6. The fabric structure according to claim 3, wherein the elastic member is provided with a length adjusting mechanism.

7. The fabric structure according to claim 6, wherein the length adjusting mechanism is a B-shaped buckle or a butterfly buckle.

8. The fabric structure according to claim 1, wherein a thickness of the shielding member is less than a thickness of the backrest fabric, and the thickness of the shielding member is less than a thickness of the headrest fabric.

9. A fabric structure, comprising:
a backrest fabric configured to cover a backrest;
a headrest fabric configured to cover a headrest, the backrest having an adjusting region, the headrest is capable of being adjusted along the adjusting region relative to the backrest; and
a shielding member configured to shield the adjusting region, an upper end of the shielding member is connected to the backrest fabric adjacent to an upper end of the adjusting region, a lower end of the shielding member is connected to the backrest fabric adjacent to a lower end of the adjusting region, and when the headrest is adjusted relative to the backrest, the shielding member is telescopic to shield the adjusting region, wherein the shielding member has a fold structure.

10. The fabric structure according to claim 1, wherein the upper end of the shielding member is fixedly connected to the backrest fabric adjacent to the upper end of the adjusting region.

11. The fabric structure according to claim 10, wherein the upper end of the shielding member is fixedly connected to the backrest fabric adjacent to the upper end of the adjusting region by sewing or adhesion.

12. A fabric structure, comprising:
a backrest fabric configured to cover a backrest;
a headrest fabric configured to cover a headrest, the backrest having an adjusting region, the headrest is capable of being adjusted along the adjusting region relative to the backrest; and
a shielding member configured to shield the adjusting region, an upper end of the shielding member is connected to the backrest fabric adjacent to an upper end of the adjusting region, a lower end of the shielding member is connected to the backrest fabric adjacent to a lower end of the adjusting region, and when the headrest is adjusted relative to the backrest, the shielding member is telescopic to shield the adjusting region, wherein the upper end of the shielding member is detachably connected to the backrest fabric adjacent to the upper end of the adjusting region.

13. The fabric structure according to claim 12, wherein the upper end of the shielding member is detachably connected to the backrest fabric adjacent to the upper end of the adjusting region by a zipper, a buckle, a bonding member, a fixed buckle and a fixed hole that are mutually matched, a HOOK&LOOP or a snap.

14. A child supporter, comprising:
a supporter body;
a backrest having an adjusting region;
a headrest provided on the supporter body; and
a headrest adjusting mechanism provided in the adjusting region, the headrest being slidably adjustable relative to the backrest along a vertical direction by the headrest adjusting mechanism; and
the fabric structure according to claim 1.

15. The child supporter according to claim 14, wherein the child supporter is a safety seat, a stroller, a cradle or an infant dining chair.

* * * * *